(12) United States Patent
Brown

(10) Patent No.: US 8,534,057 B1
(45) Date of Patent: Sep. 17, 2013

(54) ELECTRICAL GENERATOR FOR WATERWAY

(76) Inventor: Brian Brown, Darien, CT (US)

( * ) Notice: Subject to any disclaimer, the term of this patent is extended or adjusted under 35 U.S.C. 154(b) by 719 days.

(21) Appl. No.: 12/841,481

(22) Filed: Jul. 22, 2010

Related U.S. Application Data

(60) Provisional application No. 61/227,435, filed on Jul. 22, 2009.

(51) Int. Cl.
  *F03B 9/00* (2006.01)
(52) U.S. Cl.
  USPC .................................. 60/398; 290/54; 415/5
(58) Field of Classification Search
  USPC ..................... 60/398; 290/54; 415/5; 440/3
  See application file for complete search history.

(56) References Cited

U.S. PATENT DOCUMENTS

| | | | | |
|---|---|---|---|---|
| 66,456 | A | * | 7/1867 | Briggs, Sr. ........................ 415/5 |
| 286,374 | A | | 10/1883 | Baumotte |
| 471,564 | A | | 3/1892 | Neal |
| 506,725 | A | * | 10/1893 | Purdon et al. .................... 415/5 |
| 1,267,928 | A | | 5/1918 | Speegle |
| 3,882,320 | A | | 5/1975 | Schmeller |
| 3,887,817 | A | | 6/1975 | Steelman |
| 3,927,330 | A | | 12/1975 | Skorupinski |
| 4,516,033 | A | | 5/1985 | Olson |
| 4,619,582 | A | * | 10/1986 | Slonim ............................ 416/8 |
| 6,809,430 | B2 | | 10/2004 | Diederich |
| 7,063,579 | B2 | | 6/2006 | Voves |
| 7,262,517 | B1 | | 8/2007 | Srybnik |
| 7,329,963 | B2 | | 2/2008 | Omer |
| 7,605,490 | B2 | | 10/2009 | Srybnik |
| 7,902,684 | B2 | * | 3/2011 | Davison et al. ................. 290/44 |
| 2008/0303284 | A1 | | 12/2008 | Clemens |
| 2008/0303285 | A1 | | 12/2008 | Bondhus |

FOREIGN PATENT DOCUMENTS

| DE | 102007003323 A1 | * | 7/2008 |
|---|---|---|---|
| JP | 58167884 A | * | 10/1983 |

* cited by examiner

*Primary Examiner* — Thomas E Lazo
(74) *Attorney, Agent, or Firm* — QuickPatents; Kevin Prince

(57) ABSTRACT

An apparatus for generating electricity from a flowing stream of water is disclosed. A rigid frame is fixed with a pair of wheels, or with two linkages in circuit around two pairs of wheels. A plurality of blades are fixed between the wheel or linkages at their side edges, a cross-sectional area of each blade being substantially comparable to the cross-sectional area of the stream of water. An orientating mechanism is adapted to maintain the orientation of each blade such that rotation of the wheels or linkages results in an opposite rotation of each blade to maintain the orientation of the blade. As such, each blade "stabs" orthogonally into and out of the flow of water edge first, minimizing the displacement and disruption of the water upon entering. Each wheel or linkage, when mechanically coupled with a generator, results in the production of electricity.

9 Claims, 5 Drawing Sheets

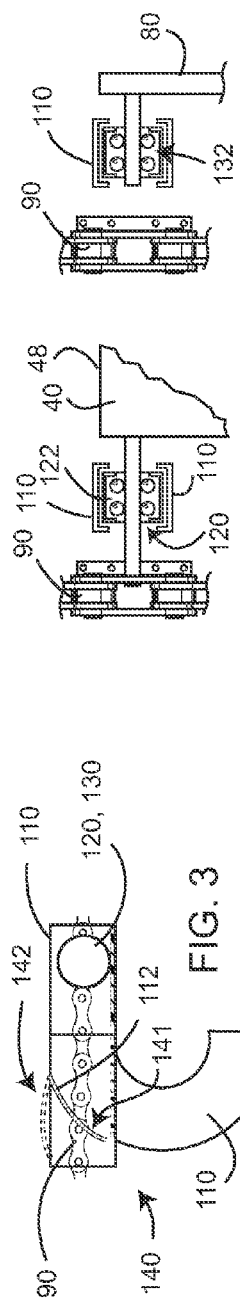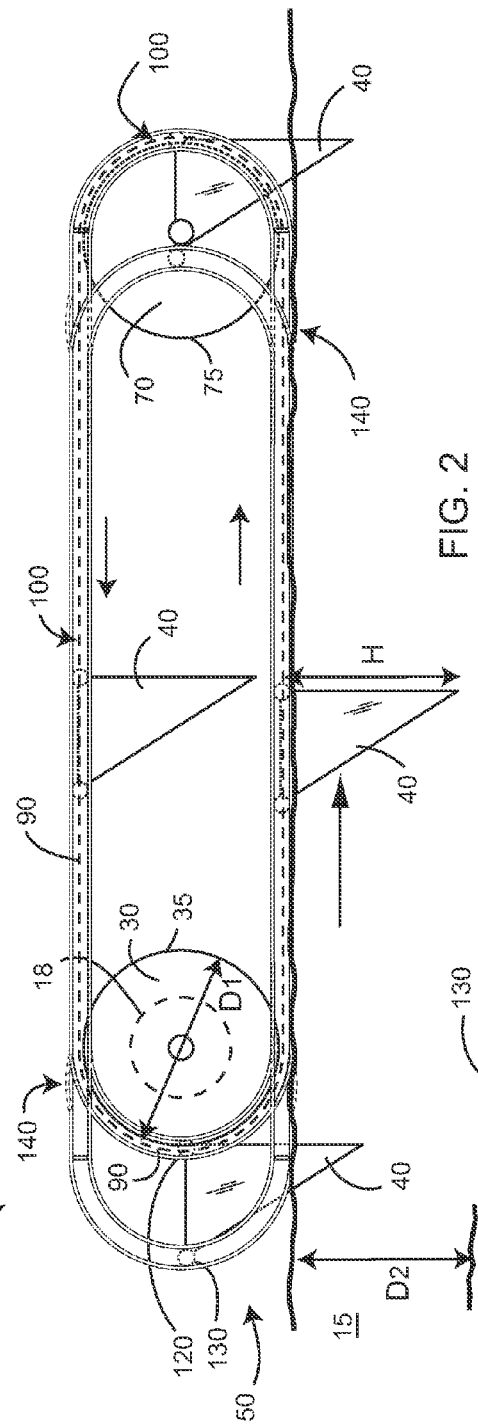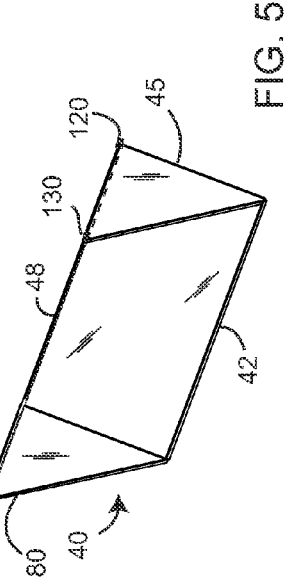

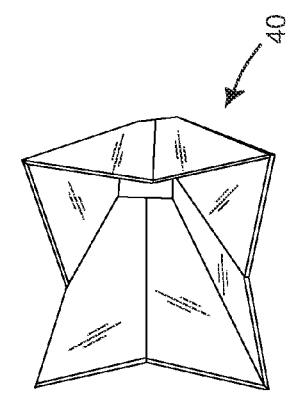
FIG. 10
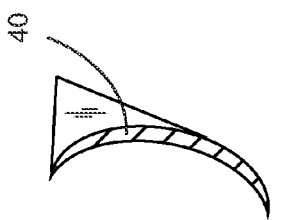
FIG. 9
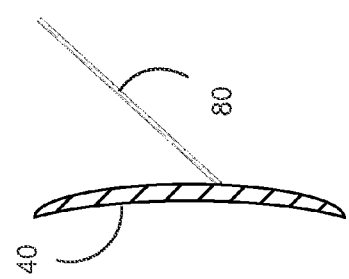
FIG. 7
FIG. 8
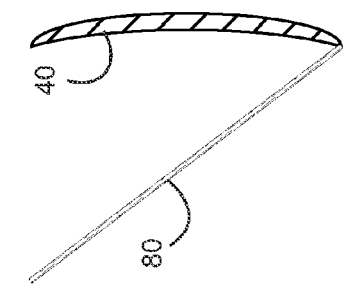
FIG. 11
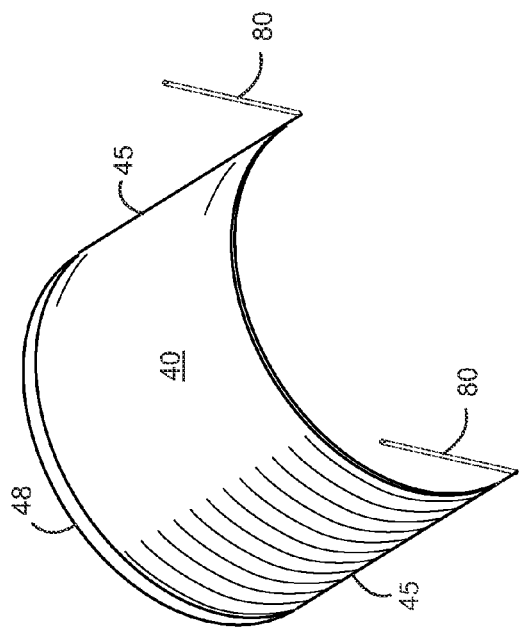
FIG. 12

ELECTRICAL GENERATOR FOR WATERWAY

CROSS-REFERENCE TO RELATED APPLICATIONS

This application claims the benefit of U.S. Provisional Patent Application 61/227,435, filed on Jul. 22, 2009, and incorporated herein by reference.

STATEMENT REGARDING FEDERALLY SPONSORED RESEARCH AND DEVELOPMENT

Not Applicable.

FIELD OF THE INVENTION

This invention relates to electrical generators, and more particularly to a generator for a flow of water.

DISCUSSION OF RELATED ART

Turbines and other devices are well known in the art for generating electricity from a flow of water, such as a river, aqueduct, tidal bay, or the like. In the case of producing electricity from a flow of water, a conventional paddle wheel dipped partially into the flow of water and mechanically coupled with a generator is one of the oldest known means of producing electricity. Modern variations of such a paddle wheel generator are taught in U.S. Pat. No. 7,262,517 to Srybnik et al. on Aug. 28, 2007; and U.S. Pat. No. 4,516,033 to Olson on May 7, 1985. One significant drawback to devices having paddles fixed to a peripheral edge of a rotating wheel is that the paddles are fixed radially in orientation with the wheel. As such, upon entering the water stream, each paddle is titled with respect to the flow of water, resulting in some of the water being diverted from along its normal course upon contacting the paddle. This results in energy lost and turbulence due to the water being redirected. Similarly, upon exiting the water stream, each paddle is titled in an opposite direction, also resulting in water being diverted from its normal course, subsequent loss of energy, and turbulence.

Belt and chain driven variations on the paddle wheel devices are also known in the art. For example, U.S. Pat. No. 3,882,320 to Schmeller on May 6, 1975, teaches an electricity generating device having a plurality of paddles fixed to a chain or belt above the flow of water and driven around two axes. A water flow is diverted into a channel into which the paddles are successively introduced, the flow of water causing rotation of the belt and a generator coupled thereto. This type of device also suffers from the drawback that as the paddles are introduced and removed from the flow of water, such paddles are not orthogonal with respect to the flow of water, which results in undesirable diversion of at least some of the water away from its normal course, turbulence, and loss of energy.

This type of device further has the drawback that as a paddle enters the stream of water, the distance between the tip of the paddle and the tip of the next adjacent paddle ahead becomes smaller, which results in the two paddles trying to compress the water therebetween. Since water is not substantially compressible, even more turbulence is caused as water rushes out of the space between the two paddles. The opposite effect occurs as a paddle is removed from the water, with water rushing in to fill the increasing volume between the paddle being removed from the water and the next adjacent paddle behind it.

Further, this type of compression and the expansion of the areas between paddles can result in such a device becoming jammed if a tree branch or other non-compressible debris enters the flow of water. Much of the prior art teaches framework and other structural supports that are submerged, causing additional loss of energy and turbulence as water impacts such surfaces.

Other prior art generating device of this type are taught in the following US patents and applications:

| Document# | Inventor | Pub. Date |
|---|---|---|
| 7,063,579 | Voves | Jun. 20, 2006 |
| 6,809,430 | Diederich | Oct. 26, 2004 |
| 3,927,330 | Skorupinski | Dec. 16, 1975 |
| 2008/0303284 | Clemens | Dec. 11, 2008 |
| 1,267,928 | Speegle | May 28, 1918 |
| 471,564 | Neal | Mar. 29, 1892 |
| 286,374 | Baumotte | Oct. 9, 1883 |

Therefore, there is a need for an electricity generating device that minimizes friction between the blades or paddles of such a device and the flow of water. Such a needed device would have nothing but the blades of the device entering the water, thereby keeping turbulence and kinetic energy loss to a minimum. Such a needed device could be easily adapted to produce electricity on a river, aqueduct, tidal bay, or the like, and would be buoyant so as to always be maintained at the optimal position regardless of the water level in the stream or bay. The present invention accomplishes these objectives.

SUMMARY OF THE INVENTION

The present device is an apparatus for coupling to a generator to generate electricity from a flowing stream of water. Such a flowing stream of water may be an aqueduct, a river, a stream, a tidal flow, a dam spillway, or the like. A rigid frame is preferably buoyant and adapted for floating on the stream of water.

In a simple embodiment of the invention, a first pair of wheels is rotationally fixed with the frame. Each wheel is mutually coaxially aligned and rotationally coupled. A plurality of blades are rotationally fixed proximate top edges thereof between each wheel proximate their peripheral edge. The top edges of each blade are substantially parallel to a common axis of the first pair of wheels. Each blade is preferably of a height that is equal to or smaller than the minimum depth of the stream of water. Further, each blade may be substantially flat, or concave with respect to the direction of the flow of water. An orientation means is adapted to maintain the orientation of each blade as the wheels rotate. As such, each blade "knifes" into the flow of water lower edge first, minimizing the displacement of the water as it enters.

As such, with the frame anchored in place above the stream of water, or floating on the stream of water, the flow of the stream of water causes each blade to rotate into and out of the stream of water with each blade entering and leaving the stream of water oriented generally orthogonally to the flow of the stream of water. Each wheel is rotated thereby, and mechanically coupling at least one of the wheels with the generator results in the production of electricity. The frame and wheels are not submerged in the stream of water. Only the blades are significantly submerged into the stream of water, thereby reducing unproductive drag of the stream of water on the apparatus.

In a preferred embodiment, the rigid frame includes the first pair of wheels, and a second pair of wheels which are each rotationally fixed with the frame, mutually coaxially aligned and rotationally coupled, and laterally offset and axially parallel to the first pair of wheels. A pair of linkages, such as a pair of belts or chains, for example, is fixed peripherally around each of the first and second pairs of wheels, each forming an opposing truncated circular path. Each linkage fixes each wheel into mutual rotation.

In such an embodiment, each blade is rotationally fixed with the linkage at edges thereof with a first rotational connector. A preferred orientation means, in such an embodiment, is a truncated circular track offset laterally from the linkage and axially parallel thereto and fixed with the frame. Each blade is further engaged with the track with a second rotational connector to maintain the orientation of each blade as the linkage moves around the truncated circular path.

The track includes a pair of switching means for alternately directing the first connector of each blade around the truncated circular path of the linkage, and for directing the second connector of each blade around the track. The switching means may each be a mechanically or electrically driven track section that is toggled between a first position or a second position based on if one of the connectors has passed. The switching means toggles with each pass of a connector or connector.

Alternately, the track and the linkage may be diagonally offset, and the track split where connector is allowed to pass therethrough. In such an embodiment, a pivoting track section may be included biased with a spring or other biasing arrangement towards a closed position to receive and direct the second rotational connector. Each first connector in such an embodiment acts on the pivoting track section to pivot same away from the track into an open position to allow passage thereof through the track.

The present invention is an electricity generating device that introduces and removes blades of the invention orthogonally to the flow of water, thereby minimizing friction between the blades and the flow of water. The present device has no structures other than the blades of the device entering the water, thereby keeping turbulence and associated kinetic energy loss to a minimum. The present invention may be easily adapted to produce electricity on a river, aqueduct, tidal bay, or the like, and may be made buoyant so as to always be maintained at an optimal position regardless of the water level in the stream or bay. Such a needed invention would also be adapted to work with currents flowing in either direction, such as with tides. Other features and advantages of the present invention will become apparent from the following more detailed description, taken in conjunction with the accompanying drawings, which illustrate, by way of example, the principles of the invention.

DESCRIPTION OF THE DRAWINGS

FIG. 2 is a partial side elevational diagram thereof, illustrating a triangular shaped blade and a truncated circular path, the frame removed for clarity of illustration;

FIG. 3 is an enlarged elevational diagram of a track switching means;

FIG. 4A is a front elevational view of a rotational connector fixed between the blade and a linkage, and traversing a track;

FIG. 4B is a front elevational view of a second rotational connector fixed between the blade and the track;

FIG. 5 is a perspective view of one embodiment of the blade of the invention;

FIG. 7 is a cross-sectional view of an alternate embodiment of the blade of the invention;

FIG. 8 is a cross-sectional view of another alternate embodiment of the blade of the invention, suitable for use with a track offset from the linkage of the invention in an opposing direction compared with that of FIG. 7;

FIG. 9 is a cross-sectional view of yet another alternate embodiment of the blade of the invention;

FIG. 10 is a perspective view of yet another alternate embodiment of the blade of the invention;

FIG. 11 is a perspective view of yet another alternate embodiment of the blade of the invention;

FIG. 12 is a perspective view of yet another alternate embodiment of the blade of the invention;

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Figure 1:
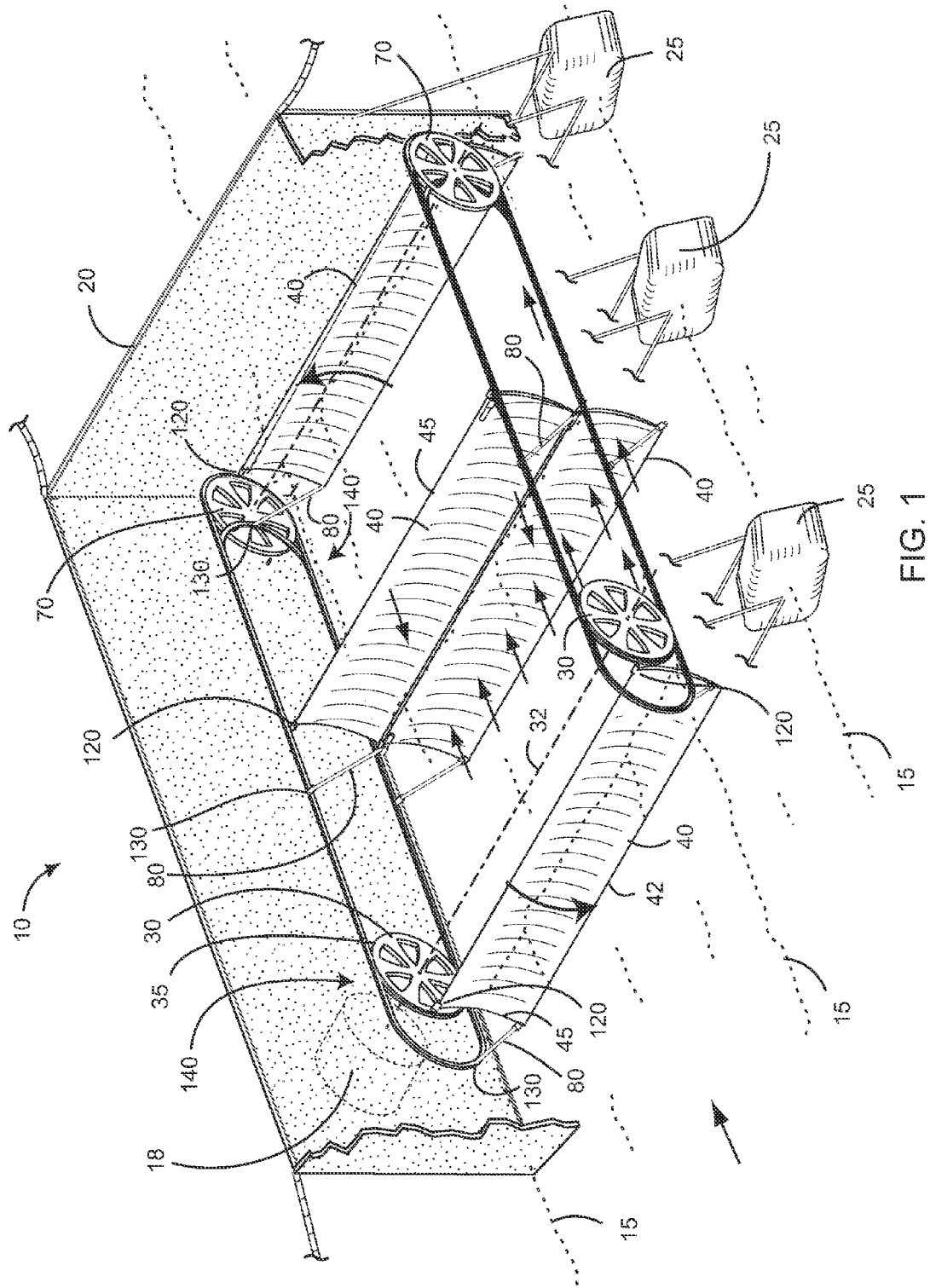
FIG. 1 is a perspective diagram, partially cut-away, of a preferred embodiment of the invention.
Figure 6:
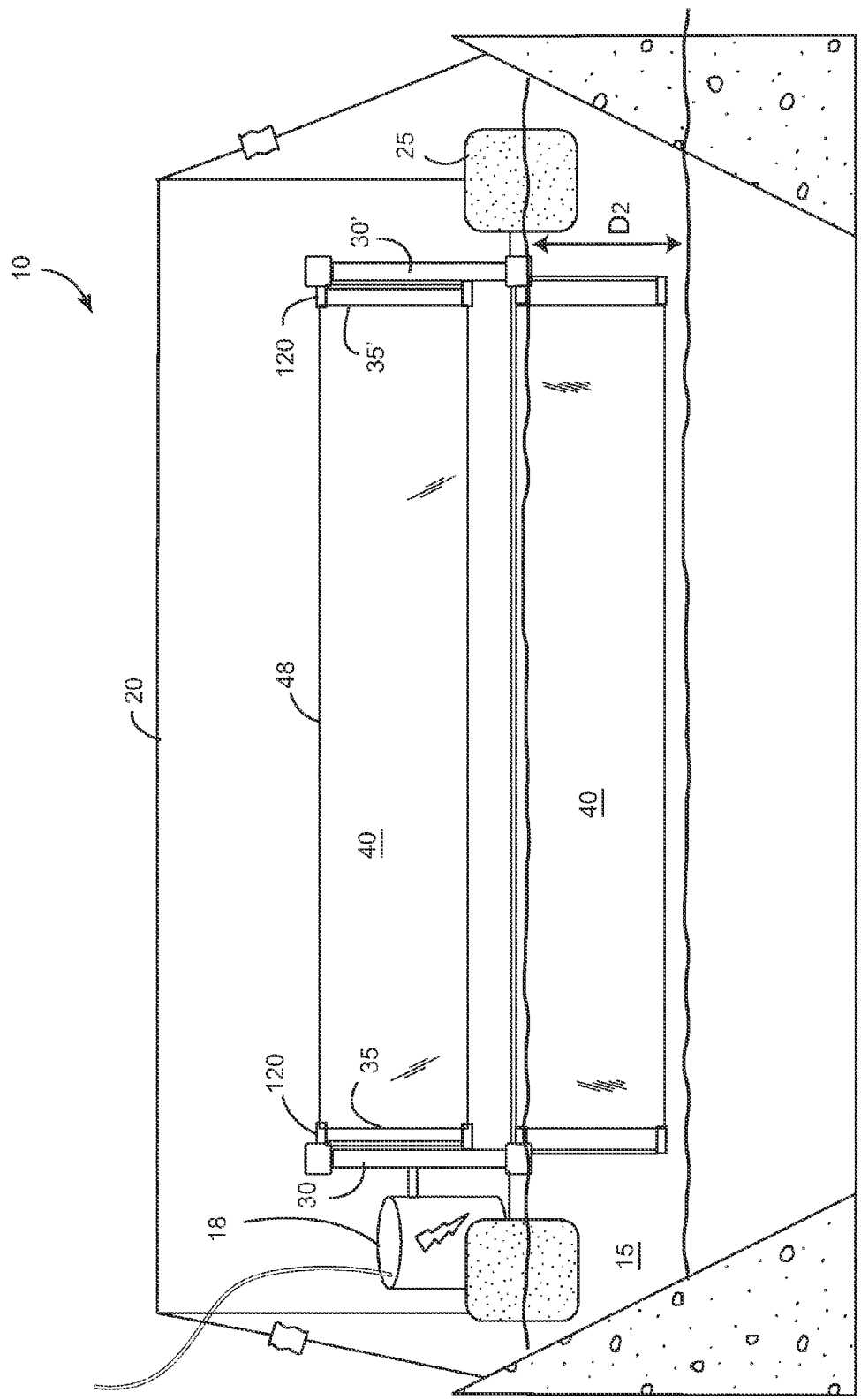
FIG. 6 is a front elevational diagram of the invention, illustrated floating on a stream of water in a water channel.

FIGS. 1 and 2 illustrate an apparatus 10 for coupling to a generator 18 to generate electricity from a flowing stream of water 15. Such a flowing stream of water 15 may be an aqueduct, a river, a stream, a tidal flow, a dam spillway, or the like.

A rigid frame 20 is preferably buoyant and adapted for floating on the stream of water 15. Floats 25 may be fixed with the frame 20 for buoyancy, such that raising or lowering of the stream of water 15 results in raising or lowering of the frame 20 thereon and a consistent position of the frame 20 with respect to the surface of the water 15. The frame 20 may also be anchored in a motorized fashion to allow for automatic motorized raising and lowering of the frame 20 as needed based on a sensed level of the stream of water 15. Alternately the frame 20 may be anchored in a fixed position in applications where the water level is not expected to change significantly.

In a simple embodiment of the invention (FIG. 15), a first pair of wheels 30 is rotationally fixed with the frame 20. Each wheel 30 is mutually coaxially aligned and rotationally coupled, such as through an axle arrangement 33. As such, a peripheral edge 35 of each wheel 30 may have teeth so as to cooperate with gears of the axle arrangement 33. Alternately, a common axle (not shown) may connect each wheel 30 along a common axis 32 of each wheel 30.

Figure 15:
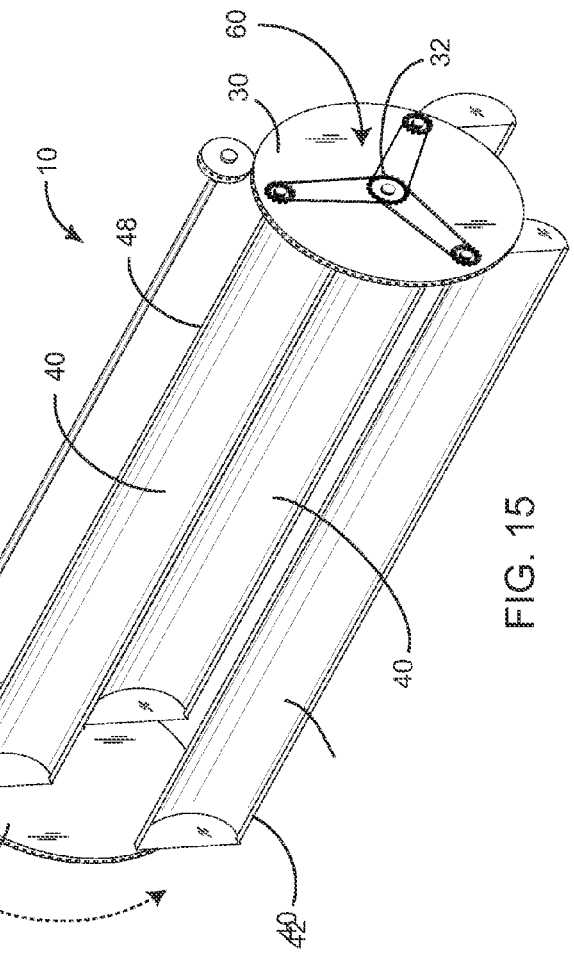
FIG. 15 is a partial perspective view of a simple embodiment of the invention, the frame removed for clarity of illustration.

In such an embodiment, a plurality of blades 40 are rotationally fixed proximate top edges 48 thereof between each wheel 30 proximate their peripheral edge 35. The top edges 48 of each blade 40 are substantially parallel to a common axis 32 of the first pair of wheels 30. Each blade 40 is preferably of a height H that is equal to or smaller than the minimum depth D2 of the stream of water 15. The height H of each blade may also be slightly less than the diameter D1 of each wheel 30, in any embodiment not having a common axle, so that a lower edge 42 of each blade 40 just misses the upper edge 48 of any other blade 40 on an opposing side of each wheel 30 as each wheel 30 rotates (FIG. 15). In an embodiment wherein each wheel 30 is connected with a common axle (not shown), each blade height H must be less than the radius of each wheel plus the radius of the common axle, so that the blade 40 does not hit the axle as it reaches a top point in its rotation about the wheel 30.

An orientation means 50, that is, a means 50 for maintaining orientation of the at least one blade 40, is adapted to maintain the orientation of each blade 40 such that rotation of each wheel 30 results in rotation of each blade 40 while maintaining the orientation of the blade 40. As such, each blade 40 "knifes" into the flow of water lower edge 42 first, minimizing the displacement of the water 15 as it enters. In the simple embodiment illustrated in FIG. 15, the orientation means 50 is a gearing arrangement 60 that rotates each blade 40 once for every rotation of each wheel 30, but in the opposite direction thereof. A simple chain and sprocket arrangement 60 as illustrated is one such example.

Each blade 40 may further be fixed with each wheel 30 with a ratcheting pivot mechanism (not shown), such that each blade 40 may only rotate with respect to each wheel 30 in the direction opposite of the rotation of each wheel 30. Further, each blade 40 may be substantially flat, or concave with respect to the direction of the flow of water 15. Various cross-sectional profiles of the blades 40 are illustrated in FIGS. 7-9, and various shapes of the blades 40 are illustrated in FIGS. 5, 10-12.

As such, with the frame 20 anchored in place above the stream of water 15, or floating on the stream of water 15, the flow of the stream of water 15 causes each blade 40 to rotate into and out of the stream of water 15 with each blade 40 entering and leaving the stream of water 15 oriented generally orthogonally to the flow of the stream of water 15. As such, each wheel 30 is rotated thereby, and mechanically coupling at least one of the wheels 30 with the generator 18 results in the production of electricity. The frame 20 and wheels 30 are not submerged in the stream of water 15. Only the blades 40 are significantly submerged into the stream of water 15, thereby reducing unproductive drag of the stream of water 15 on the apparatus 10.

In a preferred embodiment, the rigid frame 20 includes the first pair of wheels 30, and a second pair of wheels 70 (FIGS. 1 and 2) which are each rotationally fixed with the frame 20, mutually coaxially aligned and rotationally coupled, and laterally offset and axially parallel to the first pair of wheels 30.

A pair of linkages 90, such as a pair of belts or chains or the like, for example, is fixed peripherally around each of the first and second pairs of wheels 30,70 (FIG. 1), each forming an opposing truncated circular path 100. Each linkage 90 fixes each wheel 30,70 into mutual rotation.

In such an embodiment, each blade 40 is rotationally fixed with the linkage 90 at edges 45 thereof with a first rotational connector 120 (FIGS. 1 and 4A). Each rotational connector 120 may be rotationally connected to each linkage 90, or may be fixedly connected to each linkage 90 and include a central bearing 122. A preferred orientation means 50 is a truncated circular track 110 offset laterally from the linkage 90 and axially parallel thereto and fixed with the frame 20. The track 110 is preferably made from an elongated metal material, such as stainless steel or aluminum, that is durable and not subject to rusting or corrosion in wet environments.

Each blade 40 is further engaged with the track 110 with a second rotational connector 130 (FIGS. 1 and 4B) through a spacer rod 80 to maintain the orientation of each blade 40 as the linkage 90 moves around the truncated circular path 100. Each rotational connector 130 may be rotationally connected to the track 110 through a central bearing 132, or may be just a round non-rotating member (not shown) that is adapted to move around the track 110 without catching on edges thereof.

The track 110 includes a pair of switching means 140 for alternately directing the first connector 120 of each blade 40 around the truncated circular path 100 of the linkage 90, and for directing the second connector 130 of each blade 40 around the track 110. The switching means 140 may each be a mechanically or electrically driven track section 112 that is toggled between a first position 141 or a second position 142 based on if one of the connectors 120,130 has passed. The switching means 140 toggles with each pass of a connector 120 or connector 130, and may include suitably disposed contact switches electrically connected to a solenoid (not shown), for example, or the like.

Figure 14:
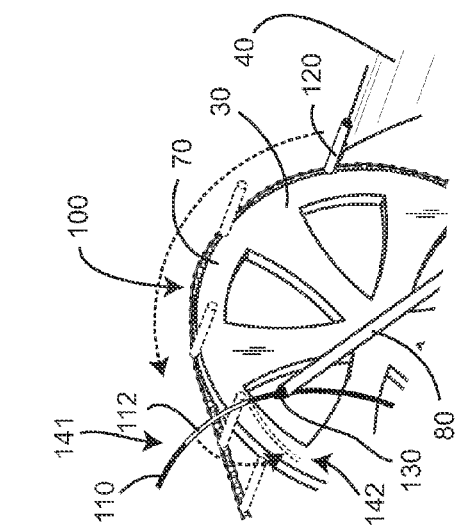
FIG. 14 is an enlarged perspective diagram of the embodiment of FIG. 13.
Figure 13:
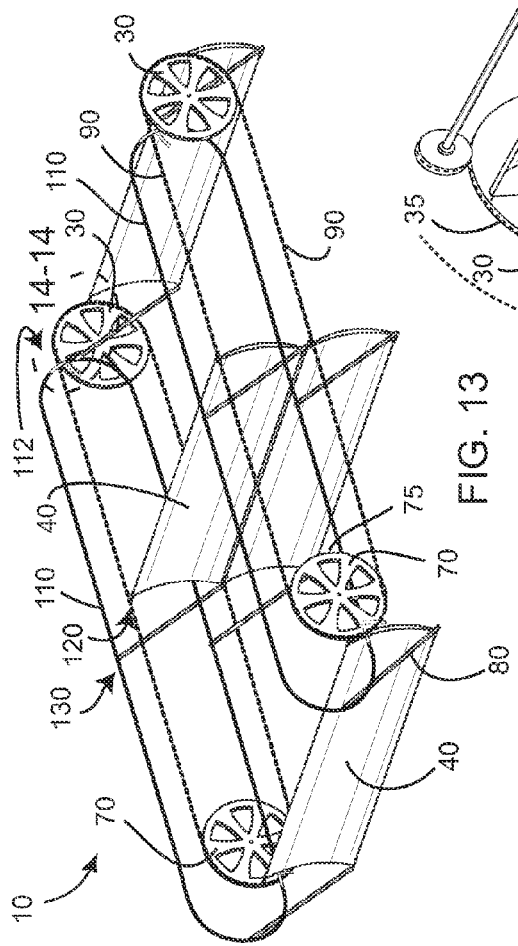
FIG. 13 is a partial perspective diagram of an alternate embodiment of the invention, the frame removed for clarity of illustration.

Alternately, the track 110 and the linkage 90 may be diagonally offset (FIGS. 13 and 14), and the track 110 split where connector 120 is allowed to pass therethrough. In such an embodiment, a pivoting track section 112 may be included biased with a spring or other biasing arrangement towards a closed position 141 (FIG. 14) to receive and direct the second rotational connector 130. Each first connector 120 in such an embodiment acts on the pivoting track section 112 to pivot same away from the track 110 into an open position 142 (FIG. 14) to allow passage thereof through the track 110. Other switching means 140 may be utilized as becomes known in the art, but preferably such switching means 140 are mechanical and require no electricity and only a minimum number of moving parts.

While a particular form of the invention has been illustrated and described, it will be apparent that various modifications can be made without departing from the spirit and scope of the invention. For example, other track switching means 140 or orientation means 50 may be utilized to maintain the vertical orientation of each blade 40. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. An apparatus for generating electricity from a flowing stream of water, comprising:
    a rigid frame;
    a first pair of wheels rotationally fixed with the frame, coaxially aligned and rotationally mutually coupled;
    a plurality of blades rotationally fixed proximate top edges thereof between each pair of wheels proximate peripheral edges thereof, the top edges of the blades being substantially parallel to a common axis of the first pair of wheels;
    a means for maintaining orientation of each blade, such that one rotation of the first wheels results in one revolution of the top edge of the blade about the common axis while maintaining the orientation of the blade;
    whereby the frame may be above the stream of water such that the flow of the stream of water causes each blade to rotate into and out of the stream of water, each blade entering and leaving the stream of water oriented generally orthogonally to the flow of the water, thereby rotating the first pair of wheels which, being mechanically coupled with a generator, produces electricity.

2. The apparatus of claim 1 wherein each blade is concave in shape.

3. The apparatus of claim 1 wherein a presented area of each blade is substantially equal to a cross-sectional area of the stream of water, and wherein the diameter of each wheel is substantially equal to the height of each blade and the minimum depth of the stream of water.

4. The apparatus of claim 1 wherein the means for maintaining orientation of the at least one blade includes a gearing arrangement that rotates each blade once for every rotation of the each wheel, but in the opposite direction thereof.

5. The apparatus of claim 1 wherein the frame is buoyant.

6. An apparatus for generating electricity from a flowing stream of water, comprising:
    a rigid frame;
    a first pair of wheels rotationally fixed with the frame, coaxially aligned and rotationally mutually coupled
    a second pair of wheels each rotationally fixed with the frame, coaxially aligned, and rotationally mutually coupled, the second pair of wheels laterally offset and axially parallel to the first pair of wheels;
    a pair of linkages fixed peripherally around one each of the first and second pairs of wheels, each forming an opposing truncated circular path, the linkage fixing each of the wheels into mutual rotation;
    a plurality of blades each rotationally fixed between each linkage;
    a means for maintaining orientation of each blade, such that rotation of the wheels results in rotation of the linkage and each blade in the truncated circular path while maintaining the orientation of the blade;
    whereby the frame may be above the stream of water such that the flow of water causes each blade to rotate into and out of the stream of water, each blade entering and leaving the stream of water oriented generally orthogonally to the flow of the water, thereby rotating each wheel, at least one of the wheels being mechanically coupled with a generator for producing electricity.

7. The apparatus of claim 6 wherein each blade is concave in shape.

8. The apparatus of claim 6 wherein a presented area of each blade is substantially equal to a cross-sectional area of the stream of water, and wherein the diameter of each wheel is substantially equal to the height of each blade and the depth of the stream of water.

9. The apparatus of claim 6 wherein the means for maintaining orientation of each blade includes a pair of opposing truncated circular tracks each offset laterally from one of the linkages, axially parallel thereto, and fixed with the frame, each blade rotationally fixed between each linkage with a first rotational connector and further engaged with each track at a second rotational connector to maintain the orientation of each blade as the linkage travels, each track including a pair of switching means for alternately directing the first connector of each blade around the truncated circular path of each linkage and for directing one of the second connector of each blade around each track.

* * * * *